(12) United States Patent
Goldberg et al.

(10) Patent No.: US 8,296,376 B2
(45) Date of Patent: Oct. 23, 2012

(54) UTILIZING E-MAIL RESPONSE TIME STATISTICS FOR MORE EFFICIENT AND EFFECTIVE USER COMMUNICATION

(75) Inventors: Itzhack Goldberg, Hadera (IL); Bruce A. Kahn, Hudson, MA (US); Boaz Mizrachi, Haifa (IL); Michael R. O'Brien, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 12/411,880

(22) Filed: Mar. 26, 2009

(65) Prior Publication Data

US 2010/0250682 A1     Sep. 30, 2010

(51) Int. Cl.
*G06F 15/16*     (2006.01)
(52) U.S. Cl. ...................................... 709/206
(58) Field of Classification Search ................... 709/206
See application file for complete search history.

(56) References Cited

U.S. PATENT DOCUMENTS

| | | | |
|---|---|---|---|
| 7,660,859 B2 * | 2/2010 | MacBeth et al. | 709/206 |
| 2004/0039630 A1 | 2/2004 | Begole et al. | |
| 2004/0243679 A1 * | 12/2004 | Tyler | 709/206 |
| 2006/0053198 A1 | 3/2006 | Pricken et al. | |
| 2006/0168058 A1 | 7/2006 | Midgley | |
| 2009/0187631 A1 * | 7/2009 | Su et al. | 709/206 |

FOREIGN PATENT DOCUMENTS

WO     WO 2009014455 A1 *     1/2009

OTHER PUBLICATIONS

Kalman et al., Email Chronemics: Unobtrusive Profiling of Response Times, Hawaii International Conference on System Sciences, 2005, p. 108b, 4, 4, HICSS, United States.
Journal of Computer-Mediated Communication, [online]; [retrieved Dec. 1, 2008]; retrieved from the Internet http://jcmc.indiana.edu/vol12/issue1/kalman.html.

* cited by examiner

*Primary Examiner* — Ryan Jakovac
(74) *Attorney, Agent, or Firm* — Cantor Colburn LLP; Edward Choi (57) ABSTRACT

A method of increasing email correspondence responsiveness may include detecting a first set of email messages transmitted by a first correspondent to a second correspondent, creating a tracking record based on the responsiveness of the second correspondent to each email message of the first set of email messages, performing a first statistical analysis of the tracking record, generating a set of responsiveness metrics based on the first statistical analysis, detecting new outgoing email messages addressed to the second correspondent, and providing a user-configurable email message format for each detected outgoing message, the user-configurable email message format. According to the example embodiment, the user-configurable email message format is configured to increase effective email response time from the second correspondent and the user-configurable email message format is based on the set of responsiveness metrics.

18 Claims, 5 Drawing Sheets

UTILIZING E-MAIL RESPONSE TIME STATISTICS FOR MORE EFFICIENT AND EFFECTIVE USER COMMUNICATION

BACKGROUND

Exemplary embodiments of the present invention relate to electronic messaging, and more particularly, to aiding electronic mail users in making email correspondence decisions.

In computer communication networks, one method of communication is electronic mail (email), in which a sending user prepares and sends a message over some form of computer network to a receiving user, usually on a remote system. Typically, upon being sent, an email message will be temporarily stored in a server system connected to the network and then retrieved from the server by an email client application operated by a recipient on the client system at the recipient's convenience. Most email clients, which are front-end computer programs that are used to read, write, and send email messages, also provide software to facilitate reading, saving, printing and replying to email messages. Email, as opposed to traditional paper based memos and postal systems or voice-based telecommunications systems such as telephones, is characteristic in that a user can send information at any time across the world as easily as across the office, to a group of people or a single recipient, or receive and view information therefrom, without the user leaving his or her desk, at any time that is convenient for the user. Other advantages include the user not having to take a note of information. Until recently, the use of electronic mail was the single biggest generator of traffic volume on the Internet.

Email has become a ubiquitous and convenient means of communication for both business and personal use, and an active email user sends and receives a number of messages in any given day. Nevertheless, because email is often used to communicate across vast distances in terms of both location and time, many social cues apparent in more traditional modes of conversation such as face-to-face meetings are absent. Many people become overloaded with more email messages than they have time to respond to. As a result, many messages are lost or go unanswered, which has the effect of disrupting workflow and efficiency, particularly where a sender of a message is expecting a response. As personal and business relations increasingly rely on email, responsiveness to email messages may affect the quality of the relationships. It can be difficult and time consuming for a sender of an email message who is awaiting a response message from a recipient of the message to accurately determine or know when to expect the response, particularly in situations where the recipient takes longer than expected to respond. The sender may have an expectation as to how quickly a particular recipient will respond to the message based on, for example, past experiences. Generally, for each individual email user, message response latency tends to be consistent. The time taken by a recipient to respond, however, can be delayed by many factors that may not be known by the sender such as, for example, the recipient's current workload, the size of the recipient's unread email message queue, or absence from the workplace. Where a sender is expecting an immediate response from a recipient that is not received, the sender may opt to attempt to communicate with the recipient through another electronic communication medium such as instant messaging or Voice over Internet Protocol (VoIP) technology. In situations where the recipient has not yet replied because he or she is unavailable for communication, these attempts are inefficient and counterproductive for the sender.

SUMMARY

An example embodiment of the present invention may include a method of increasing email correspondence responsiveness. The method may include detecting a first set of email messages transmitted by a first correspondent to a second correspondent, creating a tracking record based on the responsiveness of the second correspondent to each email message of the first set of email messages, performing a first statistical analysis of the tracking record, generating a set of responsiveness metrics based on the first statistical analysis, detecting new outgoing email messages addressed to the second correspondent, and providing a user-configurable email message format for each detected outgoing message, the user-configurable email message format. According to the example embodiment, the user-configurable email message format is configured to increase effective email response time from the second correspondent and the user-configurable email message format is based on the set of responsiveness metrics.

Another example embodiment of the present invention may include a computer program product comprising a computer usable medium having a computer readable program instructions, wherein the computer readable medium, when executed on a computer, causes the computer to perform a method of increasing email correspondence responsiveness. The method may include detecting a first set of email messages transmitted by a first correspondent to a second correspondent, creating a tracking record based on the responsiveness of the second correspondent to each email message of the first set of email messages, performing a first statistical analysis of the tracking record, generating a set of responsiveness metrics based on the first statistical analysis, detecting new outgoing email messages addressed to the second correspondent, and providing a user-configurable email message format for each detected outgoing message, the user-configurable email message format. According to the example embodiment, the user-configurable email message format is configured to increase effective email response time from the second correspondent and the user-configurable email message format is based on the set of responsiveness metrics.

Another example embodiment of the present invention may include an email correspondence system. The email correspondence system may include a first computer apparatus configured to provide email access to a first user through an email client executed on the first computer apparatus, and a second computer apparatus in communication with the first computer apparatus. The second computer apparatus may be configured to provide email access to a second user through an email client executed on the second computer apparatus. Computer readable instructions are stored in a memory of the second computer apparatus and the computer readable instructions, when executed by a processor of the second computer apparatus, cause the processor to execute a method of increasing email correspondence responsiveness. According to the example embodiment, the method includes detecting a first set of email messages transmitted by the second user to the first user, creating a tracking record stored in the memory based on the responsiveness of the first user to each email message of the first set of email messages, performing a first statistical analysis of the tracking record, generating a set of responsiveness metrics based on the first statistical analysis, detecting new outgoing email messages addressed to the first user, and providing a user-configurable email message format for each detected outgoing message. The user-configurable email message format is configured to increase effective email response time from the first user, and the user-configurable email message format is based on the set of responsiveness metrics.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other objects, features, and advantages of the invention are apparent from the following detailed description of exemplary embodiments of the present invention taken in conjunction with the accompanying drawings in which:

The detailed description explains exemplary embodiments of the present invention, together with advantages and features, by way of example with reference to the drawings. The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

DETAILED DESCRIPTION

While the specification concludes with claims defining the features of the invention that are regarded as novel, it is believed that the invention will be better understood from a consideration of the description of exemplary embodiments in conjunction with the drawings. It is of course to be understood that the embodiments described herein are merely exemplary of the invention, which can be embodied in various forms. Therefore, specific structural and functional details disclosed in relation to the exemplary embodiments described herein are not to be interpreted as limiting, but merely as a representative basis for teaching one skilled in the art to variously employ the present invention in virtually any appropriate form. Further, the terms and phrases used herein are not intended to be limiting but rather to provide an understandable description of the invention. As used herein, the singular forms "a", "an", and "the" are intended to include the plural forms as well, unless the content clearly indicates otherwise. It will be further understood that the terms "comprises", "includes", and "comprising", when used in this specification, specify the presence of stated features, integers, steps, operations, elements, components, and/or groups thereof.

People vary in terms of how responsive they typically are for email, and their individual responsiveness can also depend on a multitude of factors. For example, people's responsiveness to work-related email can vary depending on the day of the week and the time of day. Email responsiveness can vary between, for example, the start and end times of the work day, lunch periods, and regular breaks on different days. Over time, patterns can emerge as to how responsive people are in email communication based upon many factors. Knowledge of this information can be used to help a sender of an email in deciding whether email is an effective medium to use in communicating with a recipient or how email can be effectively utilized to use communicate with the recipient. Over time, people can be expected to exhibit a typical average in email response time in similar situations, which could be used, for example, to detect any changes from the typical value.

As will be described herein, exemplary embodiments of the present invention can be implemented within an email client application to provide a mechanism for tracking the email response times of individuals that receive email messages sent by a user of the email client application and performing a trend analysis of this information based on several factors to provide estimated expected response times and useful statistical data for individual recipients of messages sent by the user based upon email communications patterns for each individual recipient. Exemplary embodiments can further be implemented to provide a mechanism by which the user can configure his or her email client application to provide suggestions and issue alerts with respect to communication with recipients of messages sent by the user based upon the individual email communications patterns for the recipients (for example, the user can configure an email client application to issue an alert if the estimated expected response time for an email message sent by the user has passed without a response message being received).

As will also be described herein, exemplary embodiments of the present invention can also be implemented within a collaborative platform that supports email to provide a mechanism that can determine estimated expected response times for email messages sent by a user via an email client application provided by the email system based upon the particular intended recipient(s) of the messages and that can be configured to provide communication suggestions to the user and issue alerts to the user where the user attempts to communicate with the intended recipient of a first message sent by a user via the email client application through another communication channel supported by the collaborative platform (for example, instant messaging or VoIP technology) or via another email message prior to the expiration of the estimated expected response time for the first message.

Figure 1:
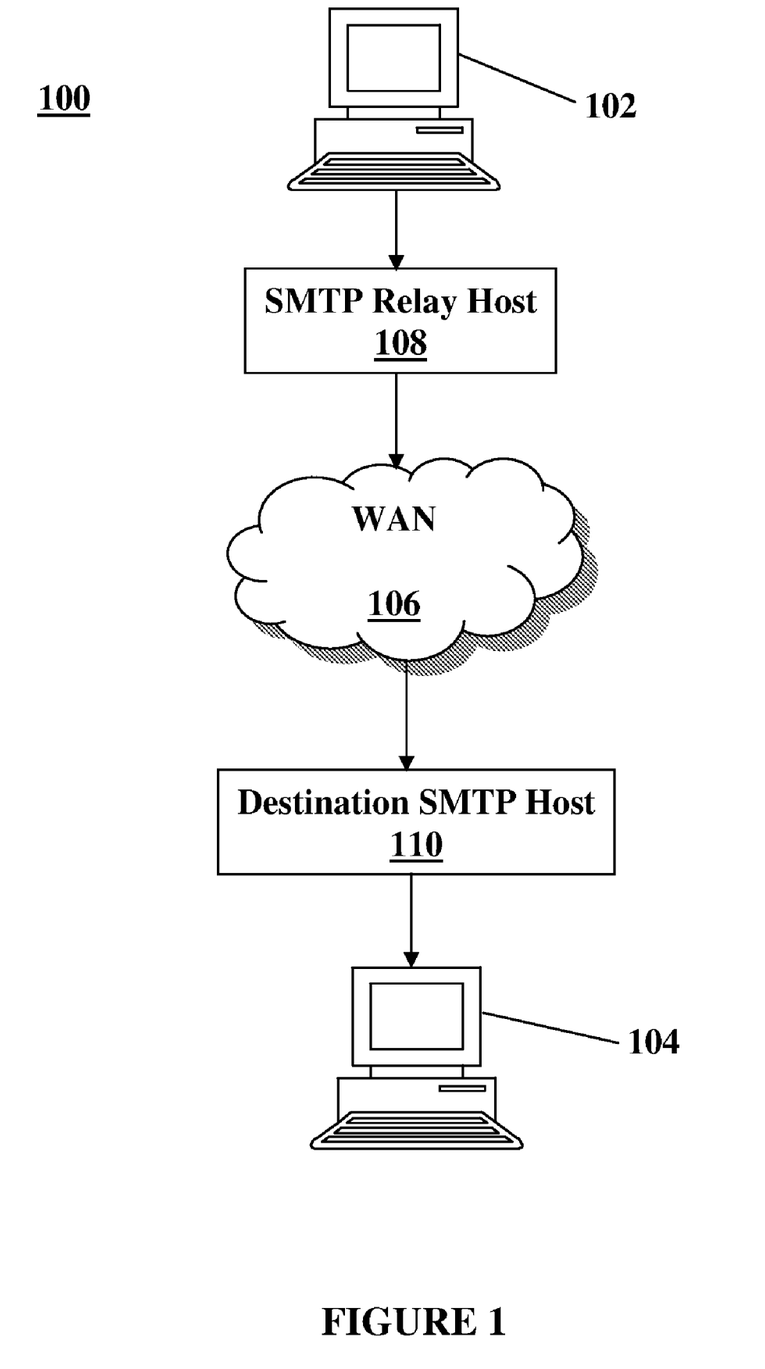
FIG. 1 is a block diagram illustrating an exemplary embodiment of a process of sending and receiving an incoming email message.

Referring now to FIG. 1, a block diagram illustrating an exemplary embodiment of a process of sending and receiving an incoming email message is provided. FIG. 1 includes sender client computer system 102 and recipient client computer system 104, operated by respective sender and recipient users, and shows the delivery path or flow of an email message. To initiate the message flow, a sender user accesses an email client application using sender client system 102 to compose and send an email message that travels through a wide area network (WAN) 106 (for example, the Internet) and is retrieved by an email client application accessed by recipient client system 104.

In the present exemplary embodiment, the email message is delivered according to the Simple Mail Transfer Protocol (SMTP) specifications as defined in RFC 2821, published by the Internet Society in April 2001 (and available on the Internet at http://www.ietf.org/rfc/rfc2821.txt). This document is herein incorporated by reference in its entirety. Initially, the message is accepted for delivery at a SMTP relay host 108 that is used by the sender's email client application (usually the delivery agent software on the machine running or in the same organization as the sender's email client application). SMTP relay host 108 then establishes a TCP connection over WAN 106 to a destination SMTP host 110 that can be accessed by the recipient's email client application or mail user agent. SMTP relay host 108 then transmits the message over WAN 106 to the recipient's mailbox, as defined by the recipient's email address, on destination SMTP host 110. The message is then stored on destination SMTP host 110 until retrieved by the recipient's email client application (for example, the next time the recipient checks for new email at the destination SMTP host using recipient client computer 104). More specifically, when the recipient user logs into SMTP host 110 through the recipient's email client application, the email client application assumes the email address registered for the logged-in recipient user. The email client application then communicates with SMTP host 110 to receive all email messages sent to that particular email address using, for example, the Post Office Protocol (POP) or the Internet Message Access Protocol (IMAP). Once retrieved through any suitable email client application, the email message can be viewed at recipient client system 104. The recipient user may also send email messages from that email address to other email addresses via the email client application.

Each client system 102, 104 is a user terminal or other client system or device implementing software for and running a respective email client application. Email client applications may also be referred to as email clients, or simply clients, and may be implemented in a variety of ways. In exemplary embodiments, the sender and the recipient of an email message, including the users of client systems 102, 104 in FIG. 1, can each utilize any of a myriad of suitable email client applications, which range from proprietary email client applications (thick clients) to web-based interfaces that send and retrieve email messages in which the user agent function is provided by a Web server and/or a back-end program (for example, a CGI program) running on the same system as the destination SMTP host. Examples of email client applications include MICROSOFT OUTLOOK, IBM's LOTUS NOTES, NETSCAPE COMMUNICATOR (or NETSCAPE 8.0), and the AOL 9.0 interactive service software (which includes the email function). Other examples of email client applications include Mozilla thunderbird, and web-mail clients such as gmail, hotmail, and the like.

In exemplary embodiments, the computer systems of client computers 102 and 104 can be one or more Personal Computers (PCs) (for example, IBM or compatible PC workstations running the MICROSOFT WINDOWS operating system or LINUX OS, MACINTOSH computers running the MAC OSX operating system, or equivalent), Personal Digital Assistants (PDAs), hand held computers, palm top computers, smart phones, game consoles, or any other suitable information processing devices. In other exemplary embodiments, the computer systems of one or more of client computers 102, 104 and mail hosts 108, 110 can be a server system (for example, SUN ULTRA workstations running the SUN operating system, IBM RS/6000 workstations and servers running the AIX operating system, or an IBM zSeries eServer running z/OS, z/VM or LINUX OS). An exemplary computer system for client computers 102 and 104 is described in greater detail below with reference to FIG. 5.

In exemplary embodiments, WAN 106 can be a circuit switched network, such as the Public Service Telephone Network (PSTN), a packet switched network (which can be a wide area network (WAN), such as the global Internet, a private WAN, a telecommunications network or any combination of the above-mentioned networks), a wired network, a wireless network, a broadcast network, or a point-to-point network.

Figure 2:
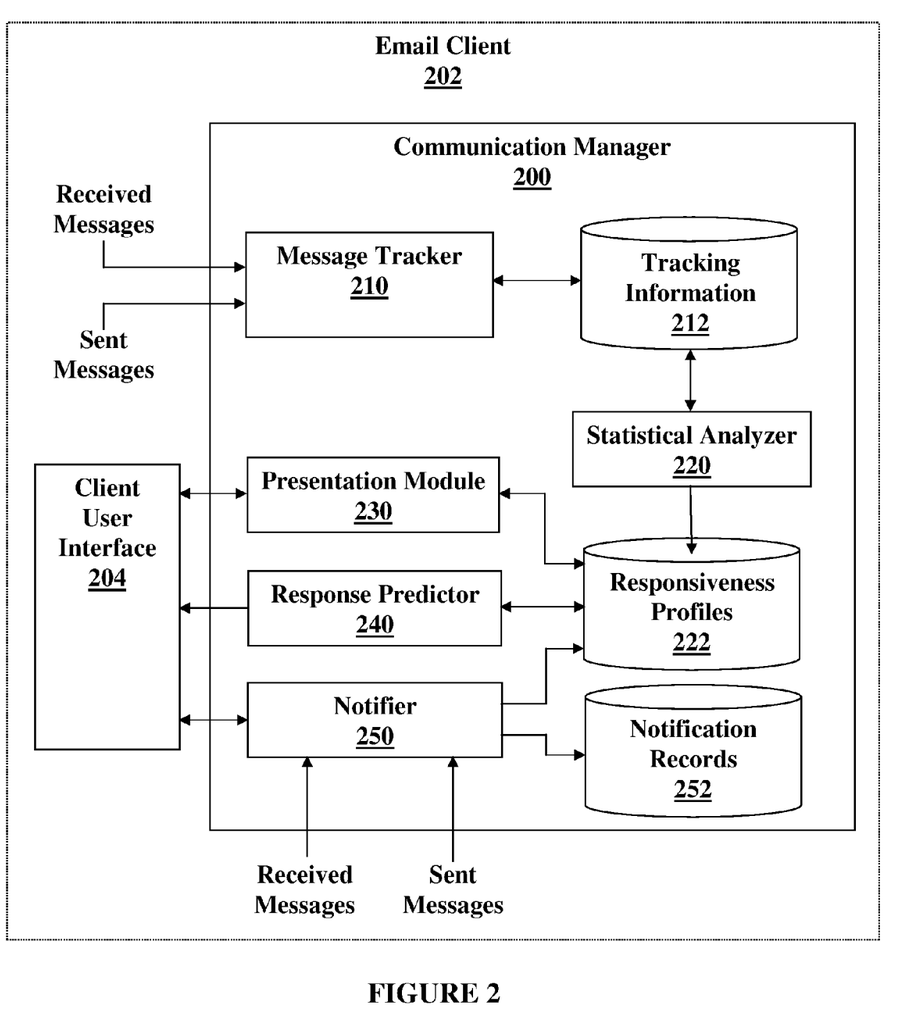
FIG. 2 is a block diagram illustrating an exemplary embodiment of an email communication manager in accordance with the present invention.

Referring now to FIG. 2, an exemplary embodiment of an email communication manager 200 in accordance with the present invention is illustrated. Exemplary communication manager 200 is suitable for implementation within an email user's email client application 202 (for example, the email client application operated on sender client system 102 or on recipient client system 104 of FIG. 1) to provide a mechanism for aiding the user in making communication decisions with respect to each individual the user engages in email correspondence with via the user's email client application. In exemplary embodiments, communication manager 200 can be implemented within email client 202 as, for example, a feature of the email client application software or a plug-in, add-on, or extension module to the email client application that expands the application's functionality.

In exemplary embodiments, communication manager 200 can be implemented within any suitable email client application or agent module containing computer program code that can be executed to permit a user of a computer system running the email client to log into an email host system, assume the email address registered for the logged-in user, communicate with the host system to retrieve email messages sent to that particular email address, present the retrieved email messages for viewing at the computer system being operated by the user, and send email messages from the email address registered for the logged-in user to other email addresses. Examples of suitable email clients include graphical email clients like APPLE MAIL, EUDORA, LOTUS NOTES, MICROSOFT OUTLOOK, and PEGASUS, text-based email clients like GNUS and PINE, and Web-based email clients like HOTMAIL and GMAIL. In alternative exemplary embodiments, communication manager 200 can be implemented as a component of a software library for use by stand-alone email client applications. Communication manager 200 can be implemented so that the integrity of email messages sent over the Internet (or other similar public or private network or internetwork) between and amongst the senders and recipients of email messages is fully maintained.

Generally, communication manager 200 includes a message tracking module 210 configured to monitor and collect data from email messages sent and received by the user via email client 202 for use in tracking response time related data with respect to each individual recipient of messages sent by user, a statistical analysis module 220 configured to process message and response time data based on a number of factors with respect to each recipient to generate an email responsiveness profile for each individual recipient of messages sent by user, a presentation module 230 configured to implement a set of user interface controls provided via a client user interface 204 implemented by email client 202 for representing the information contained in the email responsiveness profile for each individual recipient to the user, a response prediction module 240 configured to provide an expected response time and communication suggestions to the user for each individual recipient of new outgoing messages the user composes using email client 202 based on the information contained in the email responsiveness profile for the recipient, and a notification module 250 configured to provide a mechanism for the user to receive alerts regarding communication with individual recipients of messages sent by the user based on the information contained in the email responsiveness profile for the individual recipients.

As used herein, the terms "module" and "program module" both include routines, programs, objects, components, data structures, and instructions, or instructions sets, and so forth that perform particular tasks or implement particular abstract data types. As can be appreciated, the modules can be implemented as software, hardware, firmware and/or other suitable components that provide the described functionality, which may be loaded into memory of a machine embodying exemplary embodiments of an email communication manager in accordance with the present invention. Aspects of the modules may be written in a variety of programming languages, such as C, C++, Java, etc. The functionality provided by the modules described with reference to exemplary embodiments described herein can be combined and/or further partitioned.

In the present exemplary embodiment, message tracker 210 is configured to monitor and collect data from email messages sent and received by the user of email client 202 within which communication manager 200 is implemented for use in tracking response time data for each recipient of messages sent by user. More particularly, for each outgoing email message composed and sent by the user via email client 202, message tracker 210 is configured to parse each outgoing message to extract relevant data in accordance with a set of predetermined criteria and to instantiate a tracking record for each specified recipient of the outgoing message. In exemplary embodiments, message tracker 210 can be configured to extract relevant data for only a specified set of recipients of messages sent by the user, and communication manager 200 can be implemented to provide user interface controls through user interface 204 implemented by email client 202 allowing the user to specify the particular recipients for which data from outgoing messages is to be collected. Message tracker 210 is configured to store each tracking record it creates in a tracking information data store 212 that is communicatively coupled to the message tracker. As used herein, the term "data store" refers to any suitable memory device that may be used for storing data, including manual files, machine-readable files, and databases. In exemplary embodiments, tracking information data store 212 may be internal to the user's email client application or, alternatively, reside externally on a separate machine.

Figure 3:
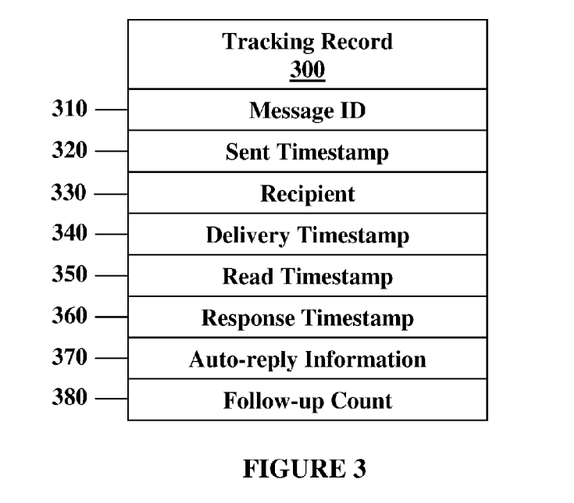
FIG. 3 is a block diagram illustrating an exemplary embodiment of a message tracking record data structure.

An exemplary embodiment of a message tracking record data structure 300 that may be employed by message tracker 210 for creating message tracking records for each specified recipient of each message sent by a user of an email client application within which exemplary communication manager 200 is implemented is illustrated in FIG. 3. In the present exemplary embodiment, tracking record data structure 300 is depicted as having eight fields, although it should be appreciated that message tracker 210 can employ a data structure having additional fields with other information, or fewer fields, in alternative exemplary embodiments. The first field is a message identification field 310 for holding an automatically generated number that uniquely identifies the particular message with which it is associated. The second field is a message sent timestamp field 320 for holding the date and time at which the message is sent by the user. The third field is a message recipient field 330 for holding an identification of the particular specified recipient of the sent message for which a message tracking record is instantiated. The identification of the specified recipient held in recipient may comprise any suitable type of user identifier such as, for example, the email address of the recipient. Because a typical email client application will permit a user to specify a list of recipients for an outgoing message, message tracker 210 can be configured to create a separate tracking record for each different recipient of each message sent by the user in data store 212. The fourth field of tracking record data structure 300 is a message delivery field 340 for holding the date and time at which the sent message is delivered to the email host system for the recipient specified in message recipient field 330. The information held in message delivery field 340 can be extracted from an incoming delivery receipt message (for example, a Delivery Status Notification message) generated by the recipient's email host system and received by the user's email client application indicating delivery of the sent message to the email host system for the email address of the recipient specified in message recipient field 330. The fifth field is a message read field 350 for holding the date and time at which the sent message is first read (that is, opened) by the recipient specified in message recipient field 330 using the recipient's email client application upon retrieving the sent message from the email host system for the recipient's email address. The information held in message read field 350 can be extracted from an incoming read receipt message (for example, a Message Disposition Notification message) generated by the recipient's email client application and received by the user's email client application indicating that the sent message has been opened a first time using the email client application for the recipient specified in message recipient field 330. The sixth field is a message response timestamp field 360 for holding the date and time at which a first message is sent in reply to the message sent by the user from the recipient of the sent message specified in message recipient field 330. The information held in response timestamp field 360 can be extracted from the reply message when it is retrieved by the user's email client application. The seventh field is an auto-reply message field 370 for holding information related to any auto-reply message received for sent message that pertains to the recipient of the sent message specified in message recipient field 330. For example, auto-reply message field 370 can hold information related to a bounce message (for example, a Non-Delivery Notification) automatically generated by an email system to indicate failed delivery of the sent message to the recipient specified in message recipient field 330. In another example, auto-reply message field 370 can hold information related to an out-of-office or vacation message automatically generated by the email system of the recipient of the sent message specified in message recipient field 330 indicating that the recipient will not be available for email communication until a specified later date. In such an example, message tracker 210 can be configured to parse the content of the out-of-office or vacation message to identify the specified date and/or time at which the recipient will be available for email communication and store this information in auto-reply message field 370. The eighth field of tracking record data structure 300 is a message follow-up field 380 for holding a value indicating the number of follow-up email messages that have been sent by the user to the recipient specified in message recipient field 330 requesting a response to the sent message for the tracking record is created.

As stated above, it should be appreciated that message tracker 210 can employ a data structure having additional fields with other relevant information extracted from email messages received and sent by the user in alternative exemplary embodiments such as, for example, whether an outgoing message is a group message sent to multiple recipients including the recipient of the sent message for which the tracking record is created, an indication of the length of the outgoing message, whether the message was sent with an indication marking the message as urgent or having a certain level of importance, or the particular time zone of the recipient of the sent message for which the tracking record is created.

During operation of exemplary communication manager 200, to create the message tracking record for each specified recipient of each outgoing message composed and sent by the user using the mail client application, message tracker 210 is configured to extract the values held in the first, second, and third fields (that is, message identification field 310, message sent timestamp field 320, and message recipient field 330) by parsing the content of the header fields of the outgoing message. Currently, the industry standard specifying a syntax for email text messages that are sent between computer users is "Request for Comments 2822" (RFC 2822), published by the Internet Society in April 2001 (and available on the Internet at http://www.ietf.org/rfc/rfc2822.txt). This document is herein incorporated by reference. Section 2 of RFC 2822 provides a lexical analysis of a standard email message, describing an email as consisting of multiple header fields (collectively called "the header section" of the message) followed, optionally, by a body. The body is simply a sequence of characters that follows the header section and is separated from the header section by an empty line (that is, a line with nothing preceding the CRLF). The header fields have a fixed format that includes a keyword name immediately after newline that is followed by a colon character (":"), a space, and a field value, which consists of a string of bytes in the field after the colon that is continued on non-null subsequent lines. In particular, message tracker 210 can obtain the message identifier value held in message identification field 310 from the 'Message-ID' header field of the outgoing message, the value held in message sent timestamp field 320 from the 'Date' header field of the outgoing message (which can indicate, for instance, the time that the user pushes the "send" or "submit" button in the user interface provided by the email client application), and the value held in message recipient field 330 from one of the destination address header fields of the outgoing message. The destination fields of a message consist of three possible fields, each of the same form: the field name, which is either 'To', 'Cc', or 'Bcc', followed by a comma-separated list of one or more addresses (from which the value held in message recipient field 330 can be extracted). It should of course be noted that the mechanisms described above for extracting the values to hold in message identification field 310, message sent timestamp field 320, and message recipient field 330 are exemplary only, and that other exemplary embodiments of the present invention implement an suitable mechanism for obtaining the data to hold in these fields using any suitable method.

In exemplary embodiments, communication manager 200 can be configured to provide a set of options permitting the user to determine when and what data should collected for use in tracking response time data for outgoing messages sent by user. These options can be implemented through user interface controls (for example, by way of menu selection, point-and-click, dialog box, or keyboard command) provided through user interface 204 implemented by email client 202. For example, upon the user pushing the "send" or "submit" button in a message composition window provided by user interface 204, communication manager 200 can implement user interface controls providing options for the user to specify whether tracking response time data should be collected for the particular message being sent, for particular specified recipients of the message, and for particular aspects of the correspondence (for instance, whether the message read time or auto-reply data should be collected). In another example, communication manager 200 can implement user interface controls through user interface 204 providing options for the user to pre-specify whether tracking response time data should be collected for particular individuals with which the user engages in email correspondence and for particular aspects of email correspondence.

During operation of exemplary communication manager 200, message tracker 210 is also configured to process incoming messages retrieved by email client 202 to extract values to hold in the fourth, fifth, sixth, and seventh fields of message tracking records (that is, message delivery field 340, message read field 350, message response timestamp field 360, and auto-reply message field 370) maintained in data store 212 for messages that have been sent by the user. It should of course be noted that the mechanisms described below for extracting the values to hold in message delivery field 340, message read field 350, message response timestamp field 360, and auto-reply message field 370 are exemplary only, and that other exemplary embodiments of the present invention implement an suitable mechanism for obtaining the data to hold in these fields using any suitable method.

In the present exemplary embodiment, for each incoming message retrieved by email client 202, message tracker 210 is configured to parse the 'In-Reply-To' message header field of the incoming message to determine if the incoming message is a reply to another message and, if so, extract the message identifier of the message to which the incoming message is a reply from the 'In-Reply-To' field. The 'In-Reply-To' field, which is used when creating a new reply to a message, contains the contents of the 'Message-ID' field of the message to which the new message is a reply. If the incoming message is a reply to another message, message tracker 210 is further configured to parse the 'From' header field of the incoming message to extract the email address for the author of the message.

If the 'From' header field of an incoming message determined by message tracker 210 to be a reply to another message as described above indicates that the message is a bounce message, the message tracker is further configured to parse the body of the message to determine the email address of the intended recipient of the original message for which delivery failed and, optionally, other information regarding the failed delivery. Message tracker 210 is then configured to access data store 212 to attempt to identify a message tracking record for a sent message having the same message identifier value as extracted from the 'In-Reply-To' field of the incoming message stored in message identification field 310 and the same recipient value as extracted from the body of the incoming message. If such a matching message tracking record is identified in data store 212, message tracker 210 is configured to store information regarding the failed delivery in auto-reply message field 370 or, alternatively, delete the matching message tracking record from data store 212 (because the original outgoing message cannot be responded to by the recipient to which delivery has failed and thus there is not an opportunity to obtain any useful response time data through analysis of the information maintained in the message tracking record).

If the 'From' header field of an incoming message is determined by message tracker 210 to be a reply to another message as described above indicates that the message is sent from an email address of a recipient of the original message to which the incoming message is a reply, the message tracker is configured to extract the value from the 'From' header field of the incoming message and access data store 212 to attempt to identify a message tracking record for a sent message having the same message identifier value as extracted from the 'In-Reply-To' field of the incoming message stored in message identification field 310 and the same recipient value stored in message recipient field 330 as extracted from the 'From' header field of the incoming message. If such a matching message tracking record is identified in data store 212, message tracker 210 is configured to parse the content of the incoming message to determine if the message is a delivery receipt, read receipt, another type of system-generated auto-reply message, or a response to the original sent message composed and sent using the email client application that retrieved the original sent message from the email host system for the email address of the recipient.

If it is determined that the incoming message is a delivery receipt, message tracker 210 is configured to parse the body of the incoming message to extract the date and time information for when the original sent message was delivered to the email host system for the email address of the recipient and to store this information in message delivery field 340 of the matching message tracking record in data store 212. Likewise, if it is determined that the incoming message is a read receipt, message tracker 210 is configured to parse the body of the incoming message to extract the date and time information for when the original sent message was first opened in the email client application that retrieved the original sent message from the email host system for the email address of the recipient and to store this information in message read field 250 of the matching message tracking record in data store 212.

If it is determined that the incoming message is an auto-reply message, message tracker 210 is configured to parse the body of the incoming message to extract information related to the auto-reply message and to store this information in auto-reply message field 370 of the matching message tracking record in data store 212. In exemplary embodiments, the specific information extracted from the auto-reply message can depend on the particular type of auto-reply message received. For example, where the auto-reply message is an out-of-office or vacation message, message tracker 210 can be configured to parse the content of the message to identify the specified date and/or time at which the recipient will be available for email communication and to store this information in auto-reply message field 370.

If a message tracking record for a sent message having the same message identifier value as extracted from the 'In-Reply-To' field of an incoming message stored in message identification field 310 and the same recipient value stored in recipient field 330 as extracted from the 'From' header field of the incoming message is identified by message tracker 210, and message tracker determines that the incoming message is a reply message to the original sent message composed and sent from the recipient's email address, the message tracker is configured to extract the date and time value from the 'Date' header field of the incoming message and store the value in message response timestamp field 360 of the matching message tracking record. Upon storing a date and time value in message response timestamp field 360 of a message tracking record in data store 212, message tracker 210 is configured to transmit the message tracking record to statistical analyzer 220 for inclusion in the response time analysis described in detail below.

Additionally, during operation of exemplary communication manager 200, message tracker 210 can be configured to increment the integer value held in message follow-up field 380 of each message tracking record maintained in data store 212 each time a follow-up email message is sent by the user to the recipient specified in message recipient field 330 requesting a response to the sent message for which the tracking record was created. The value held in message follow-up field 380 of each message tracking record can be initialized to zero when message tracker 210 creates the message tracking record. In exemplary embodiments, message tracker 210 can be configured to provide the user with an option to specify a message as a follow-up message using a suitable user interface control implemented within communication manager 200 through user interface 204 implemented by email client 202 when the user is composing and/or sending an outgoing message via the email client application and to increment message follow-up filed 380 of the respective message tracking record. In other exemplary embodiments, message tracker 210 can be configured to automatically recognize an outgoing message being sent by the user via email client 202 as a follow-up message (for example, by parsing the 'Message-ID' header field, the destination address header fields, and/or the 'Subject' header field, and/or by parsing and performing a lexical analysis of the body of the outgoing message for specified keywords or phrases indicating that the message is a follow-up message) and to increment message follow-up filed 380 of the respective message tracking record accordingly.

In exemplary embodiments, message tracker 210 can be further configured to access the user's message store maintained by email client 202 to process each message in a 'sent mail' section of the user's message store that has not been previously processed by the message tracker in the same manner as described above for outgoing messages being sent from the user's email client 202, and then process each message in a received mail section of the user's message store that has not been previously processed by the message tracker in the same manner as described above for incoming messages received by user's email client 202. Message tracker 210 can thereby "pre-load" statistical analyzer 220 with message tracking record data for individuals with whom the user engages in email correspondence so that the information provided by the particular responsiveness profile for each individual can be pre-built to provide an initial set of information from which to aid the user in making communication decisions at the time the message tracker is first used or rebuilt if, for example, the responsiveness profile data is lost or becomes corrupted.

Statistical analyzer 220 of exemplary communication manager 200 is configured to receive each message tracking record that is transmitted from message tracker 210 upon storage of a date and time value in message response timestamp field 360 of the message tracking record and to perform a statistical trend analysis of the message tracking records received with respect to each different recipient specified in the recipient fields of the message tracking records received to generate an email responsiveness profile for each individual recipient of messages sent from the user detailing the recipient's typical email response time patterns. Statistical analyzer 220 is further configured to store each responsiveness profile according to an identification of the particular recipient for which the profile is generated in a responsiveness profile data store 222 and to update the responsiveness profile for each recipient each time a new message tracking record is received from message tracker 210 that specifies the recipient in recipient field 330 by including the information provided in the new message tracking record in the statistical response trend analysis for the recipient. In exemplary embodiments, data store 222 can be maintained in the same location as the message store maintained for the user's email account by email client 202. This can allow the user to have access to the statistics either when connected at work to a server or when using a local replica while disconnected from the network at work. In particular, the trend analysis performed statistical analyzer 220 can be implemented to process the information provided in the message tracking records received for each particular recipient from message tracker 210 to generate a responsiveness profile for the recipient that includes a plurality of responsiveness metrics each describing particular patterns of email responsiveness by the recipient to messages sent from the user. Furthermore, statistical analyzer 220 can be configured to dynamically update the responsiveness profile for each individual recipient upon receiving each message tracking record from message tracker 210 by performing the trend analysis operations to include the new tracking record in the particular recipient's responsiveness profile.

The various responsiveness metrics determined by statistical analyzer 220 for each recipient's responsiveness profile can be determined according to various functions of types of response time periods. The types of response time periods used in the various functions for generating each recipient's responsiveness profile can include, for example, amount of time elapsed between a message being sent by the user to the recipient and a message being sent by the recipient in reply to the message sent by the user, amount of time elapsed between the sending of a delivery receipt message corresponding to a message sent by the user to the recipient and a message being sent by the recipient in reply to the message sent by the user, amount of time elapsed between the sending of a read receipt message corresponding to a message sent by the user to the recipient and a message being sent by the recipient in reply to the message sent by the user, amount of time elapsed between a message being sent by the user to the recipient and the sending of a read receipt message corresponding to the message sent by the user to the recipient, amount of time elapsed between the sending of a delivery receipt message corresponding to a message sent by the user to the recipient and the sending of a read receipt message corresponding to the message sent by the user to the recipient (that is, amount of time the message sent by the user to the recipient was unread by the recipient after being delivered to the recipient's mailbox), and amount of time elapsed between a date and time specified when the recipient will be available for email communication in an out-of-office or vacation auto-reply message to a message sent by the user to the recipient and a message being sent by the recipient in reply to the message sent by the user.

The responsiveness metrics generated for each particular recipient's responsiveness profile by statistical analyzer 220 using the various functions can include, for example, average, median, standard deviation, maximum, and minimum response times for each type of response time period of every reply message sent by the recipient for which the necessary information is provided in the respective message tracking record for the reply message. Furthermore, the various functions applied by statistical analyzer 220 can be further implemented to take account of various trend analysis factors to generate responsiveness metrics for each particular recipient's responsiveness profile based upon, for example, different time scales (for instance, responsiveness metrics based on certain period of activity such as a most recent month or year or responsive metrics based upon particular times of the day and/or particular days of the week such as an intraday trend for each work day) or response time periods after different numbers of follow-up messages have been sent. Furthermore, the various functions applied by statistical analyzer 220 can also be implemented to generate responsiveness metrics that account for any number of other suitable factors affecting response time such as, for example, by factoring in the date and time data extracted from out-of-office or vacation auto-reply messages to a messages sent by the user to the recipient into functions of the amount of time elapsed between a message being sent by the user to the recipient and a message being sent by the recipient in reply to the message sent by the user or between the sending of a delivery receipt corresponding to a message sent by the user to the recipient and a message being sent by the recipient in reply to the message sent by the user in cases where message tracking records do not provide read receipt information (for instance, where the recipient's email system does not support read receipts or where the recipient has opted to disable functionality providing for read receipts). The various functions applied by statistical analyzer can also be implemented to generate responsiveness metrics based on other information extracted from messages sent and received by the user such as, for example, outgoing group messages sent to multiple recipients including the recipient of the sent message for which the responsiveness profile is generated, the length of outgoing messages, whether outgoing messages were sent specified as urgent or as having a certain level of importance, or a time of day when messages are read. In exemplary embodiments, statistical analyzer 220 can implement user interface controls provided through user interface 204 implemented by email client 202 that allow the user the add functions to, modify functions in, and delete functions from the set of functions for generating the various responsiveness metrics according the particular types of information extracted from the messages sent and received by the user and stored in the message tracking records to configure the statistical analyzer to generate desired types of analysis data.

In exemplary communication manager 200, presentation module 230 is configured to access the email responsiveness profiles in data store 222 and to implement a set of user interface controls provided through user interface 204 implemented by email client 202 for presenting a formatted representation of information indicative of the responsiveness metrics generated by statistical analyzer 220 in the email responsiveness profile for each recipient to the user. For example, presentation module 230 can be implemented to render information indicative of the responsiveness metrics in the email responsiveness profile for the recipients of messages sent by the user in a graphical representation. Presentation module 230 can thereby provide the user with a gauge of the email responsiveness of each recipient of messages from the user through which the user can tailor expectations regarding particular communications. A wide range of alternative behaviors for the user can become available by providing access to such information. With information on email responsiveness, the user may improve the communication by making appropriate adjustments and thereby increasing the likelihood of not just communicating, but achieving the goal of the communication.

The representation may be implemented by presentation module 230 to provide information on only a subset of one or more of the recipients for which a responsiveness profile is maintained in data store 222 as selected by the user. Presentation module 230 can also implement various user interface controls provided through user interface 204 that permit the user to determine particular responsiveness metrics that are presented in the graphical representation, as well as how particular responsiveness metrics are presented in the graphical representation or an overall format of the graphical representation. It should be appreciated that a wide variety of graphical representations are well suited to embodiments of the present invention, including for example, color coded scales, activity graphs, clock-face representations, emoticons, and the like. As an example, the graphical representation can be implemented to plot responsiveness metrics according to hour of day or for each day of the week according to hour of day. These plots can be analyzed for hour-to-hour or day-to-day variation to discern email response time patterns for individual recipients to take into account factors such as arrival, departure, lunch periods, and other behavioral patterns.

In certain exemplary embodiments, the representation of the email responsiveness profile for a particular recipient can be provided through user interface 204 by presentation module 230 when the user is composing an outgoing message to that recipient (for example, the representation can be provided upon the user specifying the recipient in an address destination header field). The user can view and assess this information represented by presentation module 230 in making various email correspondence decisions such as, for example, a time of day to send an email message to a certain recipient for which a quick response from the recipient is desired, whether the user should choose some other communication channel to reach a certain recipient, when an email response from a certain recipient can be expected, whether to send a follow-up message to an email message sent to a certain recipient for which a response from the recipient is desired, or whether to direct an inquiry to another recipient that may be more responsive.

Response predictor 240 is configured to access the email responsiveness profiles in data store 222 and process this information to provide communication suggestions to the user for each recipient of each new outgoing message the user composes using email client 202 based on the information contained in the email responsiveness profile for the recipient. In exemplary embodiments, for instance, upon the user specifying a particular recipient in an address destination header field of an outgoing message the user is composing in a message composition window provided by email client 202 through user interface 204, response predictor 240 can be configured to provide suggestions in making various correspondence decisions based on the information provided by the responsiveness profile for that recipient such as, for example, a specific time of day at which to send the message that is more likely to result in a quick response from the recipient, a suggestion of another communication channel for reaching a certain recipient, and a predicted time at which an email response from a certain recipient can be expected. Response predictor 240 can be configured to provide the suggestions by implementing any suitable interface controls such as, for example, a dialog box, provided through user interface 204.

Notifier 250 is configured to access the email responsiveness profiles in data store 222, to process this information to provide a mechanism for the user to receive alert notifications through user interface 204 implemented by the email client 202 with respect to messages that have been sent by the user to each recipient based upon certain conditions regarding the ensuing communication related to the messages, and to monitor incoming messages received by user and outgoing messages being composed by the user to provide the selected alert notifications to the user. In exemplary embodiments, when the user is composing an outgoing message to be sent to a particular recipient (or at a later time such as after the message has been sent if desired) via email client 202, notifier 250 can implement a user interface controls through user interface 204 providing the user with a set of alert options (for example, presented in a dialog box) from which to choose for receiving alert messages regarding the particular message being composed and the particular recipient. In exemplary embodiments, notifier 250 can be configured to provide the various options to the user through any suitable interface controls such as, for example, check boxes or labeled buttons, in a message composition window provided by user interface 204.

As an example, notifier 250 can be implemented to provide the user with an option to receive an alert if a recipient of a particular outgoing message does not reply to the message within a time period specified by the user. For example, if a particular recipient on average replies to messages sent from the user within 24 hours after the recipient has first read the message, the user may find it helpful to be notified if the correspondent has not yet replied to a particular message sent from the user 3 days after the recipient has first read the message. In this situation, the user may want to send a follow-up message. The user can be provided with an option to determine whether the specified time period should be measured, for example, from the time the message is sent to the recipient, the time the message is delivered to the recipient, or from the time the message is read by the recipient. Alternatively, rather than specifying a time period, the user may specify a particular date and time at which to receive an alert if the recipient has not yet replied to the message. As another example, notifier 250 can be implemented to provide the user with an option to receive an alert upon the user attempting to send a follow-up email message to a recipient of a prior outgoing message that has not yet replied to the message and a specified time period has yet to pass. Alternatively, rather than specifying a time period, the user may specify a particular date and time up until which the alert is to be issued. The user can select the option for this alert so that the user can be made aware if, for example, the expected response can still be received within an expected time period for a response from the particular recipient.

To determine the time period or date and time to specify, the user may reference the information provided by presentation module 230 or response predictor 240 as described above. Notifier 250 can also provide the user with an option to determine whether the specified time period should be measured, for example, from the time the message is sent to the recipient, the time the message is delivered to the recipient, or from the time the message is read by the recipient. Notifier 250 can also be implemented to provide the user with the ability disable a selected option or to reset or re-specify the time period or date and time for each option at a later time.

In exemplary embodiments, notifier 250 can be configured to provide default settings for the specified time period or data and time for particular options that are determined according the responsiveness profile information in data store 222. For example, notifier 250 may use the value of the metric for the average response time after reading messages sent from the user from a particular recipient's responsiveness profile as the default value for an option to specify a time period from the time an outgoing message sent to that recipient is read by the recipient after which to provide an alert to the user. Notifier 250 may also be configured to configured to take into account other factors considered by statistical analyzer 220 in generating the responsiveness profiles in data store 222 such as, for example, whether an outgoing message is a group message sent to multiple recipients, an indication of the length of the outgoing message, whether the message was sent with an indication marking the message as urgent or having a certain level of importance, the length of the message, or a time of day the message is first read by the recipient, in providing default values for the various options provided by the notifier. Notifier 250 may further be configured to take into consideration other factors such as, for example, time zone differences and recipient out-of-office or vacation schedules (as provided in out-of-office or vacation auto-reply messages received from the recipient's email address) in determining default settings. In exemplary embodiments, where the user has selected a particular option and decided to use the specified default value for the option, notifier 250 can be implemented to reset or update the value for that option according to subsequent communication actions related to the particular outgoing message for which the option was selected.

In the present exemplary embodiment, notifier 250 is configured to generate an alert notification record for each alert notification selected for each outgoing message sent by the user and to maintain a list of the generated alert notification records in a notification record data store 252. Each notification can include a first message identification field for holding the unique identifier for the particular message with which it is associated, a message sent timestamp field for holding the date and time at which the message is sent by the user, a message recipient field for holding an identification of the particular recipient of the sent message for which the alert is requested, an alert description field describing the particular events upon which the alert is to be provided, and a parameter field describing the time period or data and time for the alert specified by the user or set by notifier 250 based upon the information in the responsiveness profile the particular recipient of the sent message for which the alert is requested. When the time period or date and time for a specified alert notification has passed or certain conditions has been satisfied, notifier 250 can delete the alert notification from data store 252.

Whenever the conditions for providing an alert selected by the user are satisfied, notifier 250 is configured to generate and provide the selected alert notification to the user that includes a description of the particular conditions that were satisfied to cause the alert to issue. Notifier 250 can be implemented to provide the alert to the user through any suitable user interface controls through user interface 204 implemented by the email client 202, or alternatively, through some other mechanism such as, for example, as a new incoming email message received for the user by email client 202. Notifier 250 may also be configured to store an indication or copy of each alert notification that has been provided to the user in an event log maintained within data store 252, and configured to access data store 252 to provide a record of which notifications have been previously provided to the user and the dates and times at which these notification were provided. Based on the content of the event log, the notifier 250 may operate to limit the number of times a particular alert notification is provided to the user with regard to particular set of conditions being satisfied. For example, the event generating process may operate to provide event notifications regarding a particular set of conditions being repeatedly or continually satisfied once per a pre-determined or user-configured time period, such as once per day.

In exemplary embodiments, communication manager 200 can be implemented within an email client supported by a collaborative platform such as a web-based Integrated Collaboration Environment (ICE) (for example, Click to Meet). A collaborative platform can be implemented through a distributed computing system to provide an environment for a virtual team to engage in asynchronous and synchronous collaboration and communication by incorporating various types of collaborative software tools. A collaborative platform may support features such as email, calendaring and scheduling, application sharing, workflow systems, web-based conferencing, desktop videoconferencing, telephony, Voice over Internet Protocol (VoIP) technology, and instant messaging into a single collaborative environment. Through the features supported by a collaborative platform, each participant of a virtual team can operate a client system to access and interact with the other participants despite being in dispersed locations.

In exemplary embodiments in which communication manager 200 is implemented within an email client supported by a collaborative platform, the communication manager can be configured to provide additional functionality based on the different communication channels supported by the collaborative platform. For example, in situations where the user has selected an option to receive an alert provided by notifier 250 if a recipient of a particular outgoing message has not replied to the message within a specified time period, where the conditions have been satisfied to cause the notifier to generate the alert, the notifier can be configured to suggest an alternate communication channel supported by the collaboration platform that can be used by the user to contact the recipient to better achieve the objectives of the communication. As another example, in situations where the user has selected an option to receive an alert provided by notifier 250 upon the user attempting to send a follow-up email message to a recipient of a prior outgoing message that has not yet replied to the message where specified time period has yet to pass, where the conditions have been satisfied to cause the notifier to generate the alert, the notifier can be configured to inform the user expected response can still be received from the recipient within the specified time period, but also suggest an alternate communication channel supported by the collaboration platform that can be used by the user to contact the recipient to better achieve the objectives of the communication.

Figure 4A:
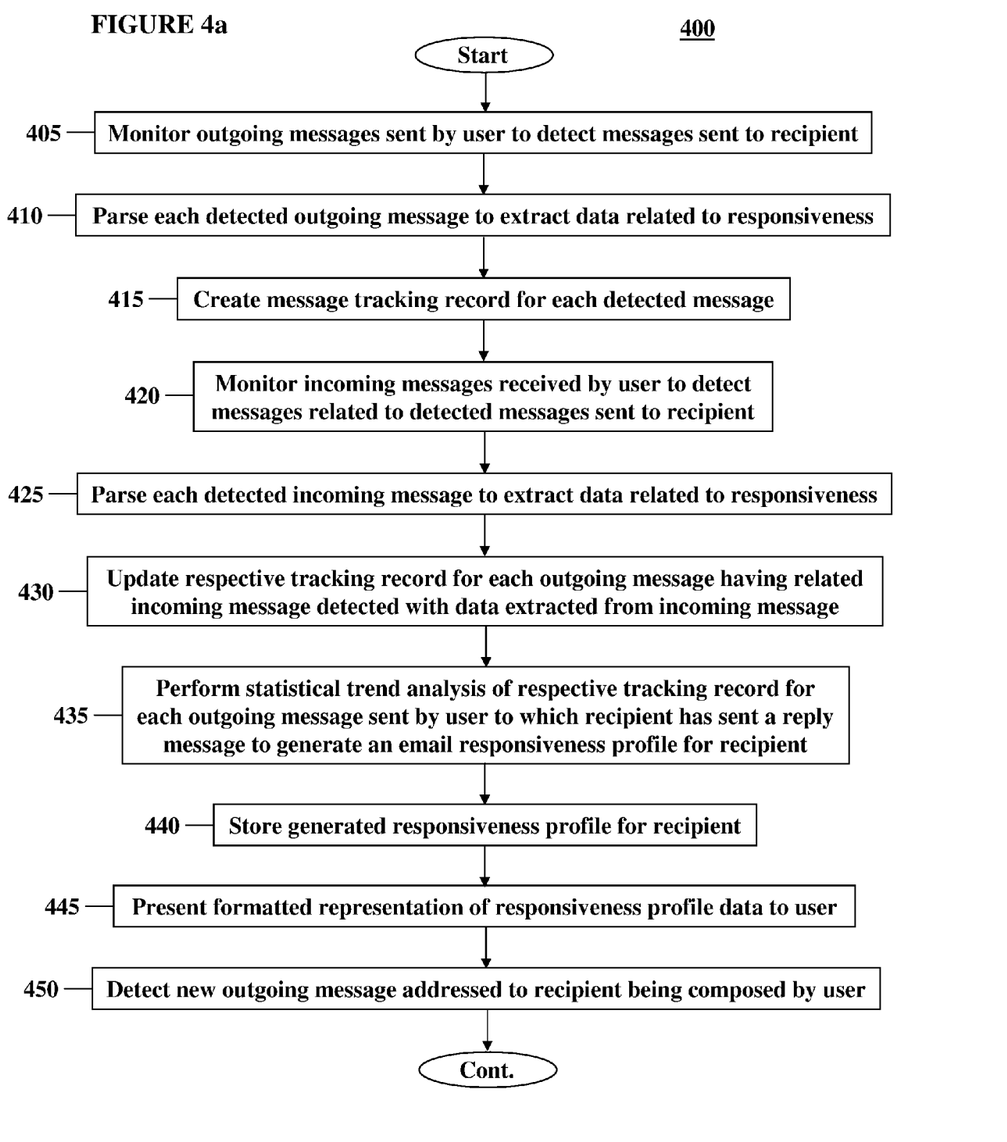
FIG. 4*a*-4*b* are flow diagrams illustrating an exemplary embodiment of a process of aiding an email user in communicating with a particular recipient of an email message composed and sent by the user via an email client application being operated by the user on a client system is illustrated.
Figure 4B:
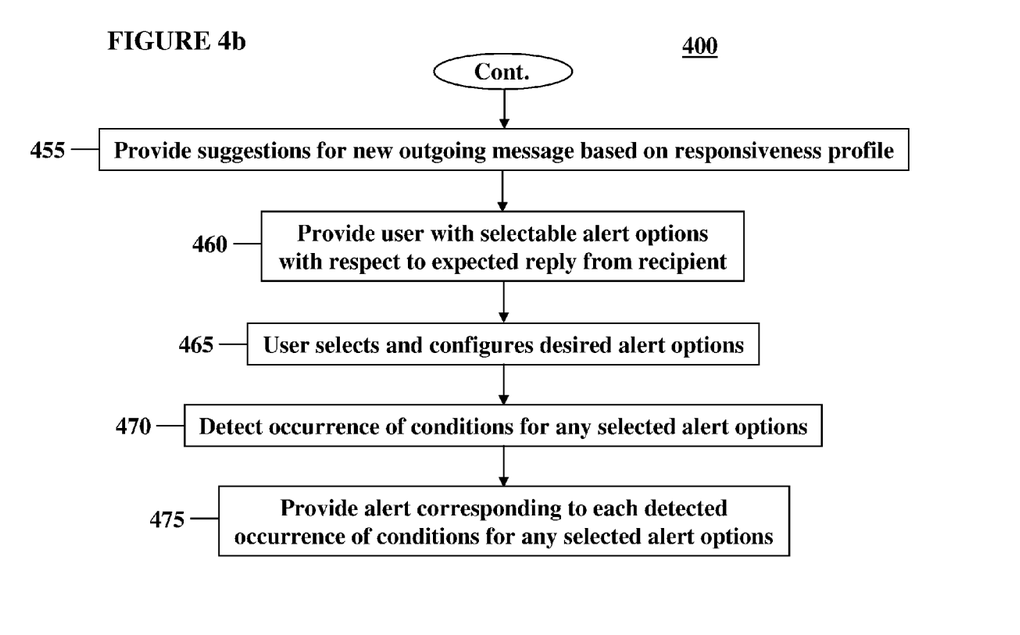

Referring now to FIG. 4a-4b, a flow chart illustrating an exemplary embodiment of a process 400 of aiding an email user in communicating with a particular recipient of an email message composed and sent by the user via an email client application being operated by the user on a client system is provided. In exemplary process 400, at block 405, outgoing messages sent by the user via an email client application are monitored to detect email messages sent by the user to the recipient. At block 410, each detected email message sent by the user to the recipient is parsed to extract data relevant to determining email responsiveness patterns with respect to the recipient according to a set of predetermined criteria. The data extracted from each detected outgoing message addressed to the recipient at block 410 can include a unique identifier of the outgoing message with which it is associated, a timestamp of the date and time at which the message is sent by the user, an identification of the particular recipient for which exemplary process 400 is being performed to aid in communication by the user, an indication of whether the outgoing message is a group message sent to multiple recipients including the particular recipient for which exemplary process 400 is being performed, an indication of the length of the outgoing message, and an indication of whether the outgoing message was marked by the user as being urgent or having a certain level of importance. At block 415, a respective message tracking record is created and stored in a first data store for each email message sent by the user to the recipient detected at block 405 that contains the data extracted from the message at block 410.

In exemplary process 400, at block 420, incoming email messages addressed to the user that are retrieved by the user's email client application are processed to detect messages sent in reply to, or messages that are otherwise related to, a previous message sent by the user to the recipient. In particular, at block 420, each incoming message that is retrieved can be parsed to detect whether the incoming message is a reply to, or otherwise related to, a previous message sent by the user and, for each incoming message that is detected to a be a reply to, or otherwise related to, a previous message sent by the user, to extract an identification of the sender of each message and the unique identifier of the prior message sent by the user to which the incoming message is a reply. The sender identification and/or the unique identifier of the prior message sent by the user to which the incoming message is a reply to, or otherwise related to, a previous message sent by the user that is extracted from each such incoming message can then be compared with the message tracking records maintained in the first data store to attempt to identify a respective message tracking record for the prior message sent by the user to which the incoming message is a reply or otherwise related. At block 425, each incoming message that is detected as being a reply to, or otherwise related to, a previous message sent by the user for which a respective message tracking record is maintained in the first data store is parsed to extract data relevant to determining email responsiveness patterns with respect to the recipient according to a set of predetermined criteria. The data extracted from each incoming message detected as described at block 425 can include a timestamp of the date and time at which the previous message sent to the recipient was delivered to the email host system for the recipient if the detected incoming message is a delivery receipt message generated by the recipient's email host system, a timestamp of the date and time at which the previous message sent to the recipient first read (that is, opened) in the recipient's email client application if the detected incoming message is a read receipt message generated by the recipient's email host system, a timestamp of the date and time at which the detected incoming message was sent in reply to the previous message by the recipient if the detected incoming message is a reply message composed by the recipient, a specified set of relevant information if the detected incoming message is an automatically generated reply message generated in response to the previous message sent to the recipient (for example, a bounce message or an out-of-office or vacation message indicating that the recipient will not be available for email communication until a specified later date), and an indication of the particular time zone of the system from which the detected incoming message was sent if the detected message is a reply message composed by the recipient. At block 430, for each incoming message that is detected at block 420 as being a reply to, or otherwise related to, a previous message sent by the user for which a respective message tracking record is maintained in the first data store, the respective message tracking record for the previous message sent by the user is updated to include the data extracted from the detected incoming message at block 425.

In exemplary process 400, at block 435, a statistical trend analysis of the data contained in the respective message tracking records maintained in the first data store for each email outgoing message sent by the user to the recipient for which an incoming message detected at block 420 that is a reply message composed by the recipient in response to the outgoing message sent by the user has been received is performed to generate an email responsiveness profile for the particular recipient detailing the recipient's typical email response time patterns to email messages sent from the user. The generated email responsiveness profile for the recipient can include a plurality of responsiveness metrics each describing particular patterns of email responsiveness by the recipient determined according to various functions of types of response time periods. The types of response time periods used in the various functions for generating each recipient's responsiveness profile can include, for example, amount of time elapsed between a message being sent by the user to the recipient and a message being sent by the recipient in reply to the message sent by the user, amount of time elapsed between receiving a delivery receipt for a message sent by the user to the recipient and a message being sent by the recipient in reply to the message sent by the user, amount of time elapsed between receiving a read receipt for a message sent by the user to the recipient and a message being sent by the recipient in reply to the message sent by the user, amount of time elapsed between a message being sent by the user to the recipient and receiving a read receipt for the message sent by the user to the recipient, and amount of time elapsed between a date and time specified when the recipient will be available for email communication in an out-of-office or vacation auto-reply message to a message sent by the user to the recipient and a message being sent by the recipient in reply to the message sent by the user. The responsiveness metrics generated for the email responsiveness profile using the various functions can include, for example, average, median, standard deviation, maximum, and minimum response times for each type of response time period of every reply message sent by the recipient for which the necessary information is provided in the respective message tracking record for the reply message and, furthermore, can take account of a plurality of other predetermined trend analysis factors (for example, time scales). At block 440, the generated email responsiveness profile for the recipient is stored in a second data store.

In exemplary process 400, at block 445, a formatted representation of information indicative of the responsiveness metrics of the generated email responsiveness profile for the recipient is presented to the user. At block 450, a new outgoing email message being composed by the user to the recipient is detected. At block 455, the responsiveness metrics of the generated email responsiveness profile for the recipient are processed to provide communication suggestions to the user with respect the new outgoing message. At block 460, the user is provided with a set of alert options from which to choose for providing alert messages to the user upon the occurrence of certain conditions with respect to an expected reply message from the recipient to the new outgoing message. At block 465, the user selects one or more of the alert options and configures each selected alert options by specifying any necessary conditions. At block 470, incoming email messages addressed to the user that are retrieved by the user's email client application are processed to detect the occurrence of the conditions for any of the alert options selected by the user with respect to an expected reply message from the recipient to the new outgoing message. At block 475, upon each occurrence of the conditions for any of the alert options selected by the user, the corresponding alert message is generated and presented to the user.

In the preceding description, for purposes of explanation, numerous specific details are set forth in order to provide a thorough understanding of the described exemplary embodiments. Nevertheless, one skilled in the art will appreciate that many other embodiments may be practiced without these specific details and structural, logical, and electrical changes may be made.

Some portions of the exemplary embodiments described above are presented in terms of algorithms and symbolic representations of operations on data bits within a processor-based system. The operations are those requiring physical manipulations of physical quantities. These quantities may take the form of electrical, magnetic, optical, or other physical signals capable of being stored, transferred, combined, compared, and otherwise manipulated, and are referred to, principally for reasons of common usage, as bits, values, elements, symbols, characters, terms, numbers, or the like. Nevertheless, it should be noted that all of these and similar terms are to be associated with the appropriate physical quantities and are merely convenient labels applied to these quantities. Unless specifically stated otherwise as apparent from the description, terms such as "executing" or "processing" or "computing" or "calculating" or "determining" or the like, may refer to the action and processes of a processor-based system, or similar electronic computing device, that manipulates and transforms data represented as physical quantities within the processor-based system's storage into other data similarly represented or other such information storage, transmission or display devices.

Exemplary embodiments of the present invention can be realized in hardware, software, or a combination of hardware and software. Exemplary embodiments can be implemented using one or more program modules and data storage units. Exemplary embodiments can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

Exemplary embodiments of the present invention can also be embedded in a computer program product, which comprises all the features enabling the implementation of the methods described herein, and which—when loaded in a computer system—is able to carry out these methods. Computer program means or computer program as used in the present invention indicates any expression, in any language, code or notation, of a set of instructions intended to cause a system having an information processing capability to perform a particular function either directly or after either or both of the following: (a) conversion to another language, code or, notation; and (b) reproduction in a different material form.

A computer system in which exemplary embodiments can be implemented may include, inter alia, one or more computers and at least a computer program product on a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface including a wired network or a wireless network that allow a computer system to read such computer readable information.

Figure 5:
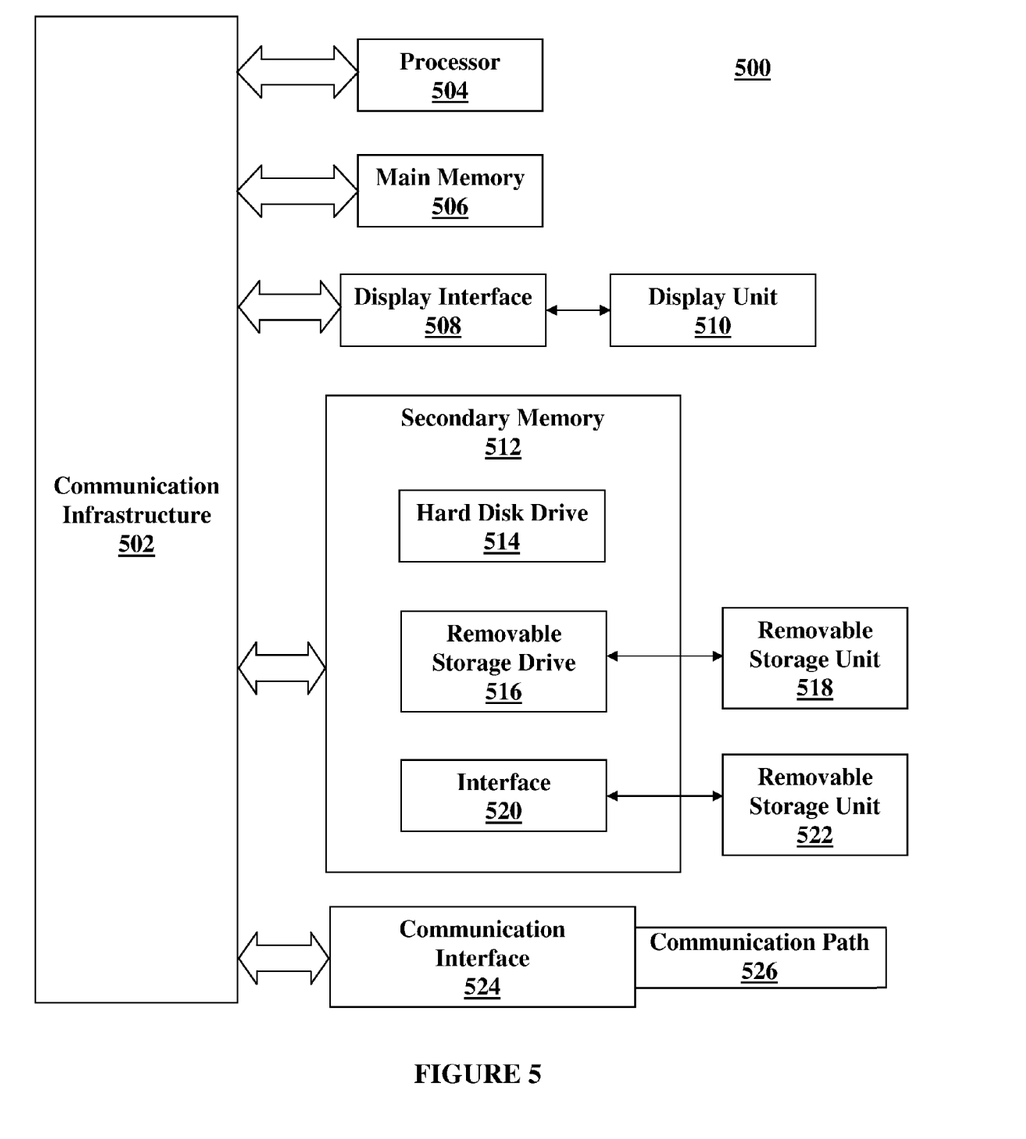
FIG. 5 is a block diagram illustrating an exemplary computer system that can be used for implementing exemplary embodiments of the present invention.

FIG. 5 is a block diagram of an exemplary computer system 500 that can be used for implementing exemplary embodiments of the present invention. Computer system 500 includes one or more processors, such as processor 504. Processor 504 is connected to a communication infrastructure 502 (for example, a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

Exemplary computer system 500 can include a display interface 508 that forwards graphics, text, and other data from the communication infrastructure 502 (or from a frame buffer not shown) for display on a display unit 510. Computer system 500 also includes a main memory 506, which can be random access memory (RAM), and may also include a secondary memory 512. Secondary memory 512 may include, for example, a hard disk drive 514 and/or a removable storage drive 516, representing a floppy disk drive, a magnetic tape drive, an optical disk drive, etc. Removable storage drive 516 reads from and/or writes to a removable storage unit 518 in a manner well known to those having ordinary skill in the art. Removable storage unit 518, represents, for example, a floppy disk, magnetic tape, optical disk, etc. which is read by and written to by removable storage drive 516. As will be appreciated, removable storage unit 518 includes a computer usable storage medium having stored therein computer software and/or data.

In exemplary embodiments, secondary memory 512 may include other similar means for allowing computer programs or other instructions to be loaded into the computer system. Such means may include, for example, a removable storage unit 522 and an interface 520. Examples of such may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between the computer system and external devices. Examples of communications interface 524 may include a modem, a network interface (such as an Ethernet card), a communications port, a PCMCIA slot and card, etc. Software and data transferred via communications interface 524 are in the form of signals which may be, for example, electronic, electromagnetic, optical, or other signals capable of being received by communications interface 524. These signals are provided to communications interface 524 via a communications path (that is, channel) 526. Channel 526 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 506 and secondary memory 512, removable storage drive 516, a hard disk installed in hard disk drive 514, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It can be used, for example, to transport information, such as data and computer instructions, between computer systems. Furthermore, the computer readable medium may comprise computer readable information in a transitory state medium such as a network link and/or a network interface including a wired network or a wireless network that allow a computer to read such computer readable information.

Computer programs (also called computer control logic) are stored in main memory 506 and/or secondary memory 512. Computer programs may also be received via communications interface 524. Such computer programs, when executed, can enable the computer system to perform the features of exemplary embodiments of the present invention as discussed herein. In particular, the computer programs, when executed, enable processor 504 to perform the features of computer system 500. Accordingly, such computer programs represent controllers of the computer system.

Although exemplary embodiments of the present invention have been described in detail, the present description is not intended to be exhaustive or limiting of the invention to the described embodiments. It should be understood that various changes, substitutions and alterations could be made thereto without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present invention.

The exemplary embodiments presented herein were chosen and described to best explain the principles of the present invention and the practical application, and to enable others of ordinary skill in the art to understand the invention. It will be understood that those skilled in the art, both now and in the future, may make various modifications to the exemplary embodiments described herein without departing from the spirit and the scope of the present invention as set forth in the following claims. These following claims should be construed to maintain the proper protection for the present invention.

The invention claimed is:

1. A computer-implemented method of increasing email correspondence responsiveness, the method comprising:
   detecting, at a computer processor, a first set of email messages transmitted by a first correspondent to a second correspondent;
   creating a tracking record based on the responsiveness of the second correspondent to each email message of the first set of email messages;
   performing a first statistical analysis of the tracking record;
   generating a set of responsiveness metrics based on the first statistical analysis;
   detecting new outgoing email messages addressed to the second correspondent; and
   providing a user-configurable email message format for each detected outgoing message, the user-configurable email message format being configured to increase effective email response time from the second correspondent, and the user-configurable email message format being based on the set of responsiveness metrics;
   wherein the user-configurable email message format includes a set of selectable alert options to the first correspondent using a set of user interface controls, and
   wherein the set of selectable alert options includes a first option and a second option, the first option being for a first alert to be provided if the expected time at which the second correspondent will send a reply message to the new outgoing email message has passed, and the second option for a second alert to be provided upon the first correspondent composing a follow-up email message to the new outgoing email message to the second correspondent in the message composition window if the expected time at which the second correspondent will send a reply message to the new outgoing email message has not passed.

2. The method of claim 1, further comprising:
displaying a formatted representation of the set of responsiveness metrics to the first correspondent within an email client associated with the first correspondent, the email client storing the first set of email messages in a message store.

3. The method of claim 1, further comprising:
detecting a second set of email messages transmitted by the second correspondent to the first correspondent;
updating the tracking record based on the responsiveness of the second correspondent associated with each email message of the second set of email messages;
performing a second statistical analysis of the second set of email messages transmitted to the second correspondent; and
generating the set of responsiveness metrics based on the first statistical analysis and the second statistical analysis.

4. The method of claim 3, wherein:
the second set of email messages includes a set of reply messages and a set of read receipt messages, each reply message of the set of reply messages having been sent by the second correspondent to the first correspondent in response to a corresponding message of the first set of email messages.

5. The method of claim 4, wherein:
the set of reply messages indicates times at which a reply message was sent; and
the set of read receipt messages indicates elapsed times between a time at which a corresponding message of the first set of email messages was accessed by the second correspondent and a time at which said corresponding message was transmitted.

6. The method of claim 3, wherein detecting the second set of email messages comprises parsing each message of messages stored in an email client associated with the first correspondent to identify messages sent from the second correspondent to the first correspondent.

7. The method of claim 1, wherein the set of responsiveness metrics includes an average time metric, a median time metric, a maximal time metric, and a minimal time metric for response time periods associated with the first set of email messages.

8. The method of claim 1, wherein:
the set of responsiveness metrics includes at least one responsiveness metric based on a first set of response time periods;
each response time period of the first set of response time periods describes an amount of time elapsed between the time indicated by a respective reply message of the second set of email messages at which a respective reply message was sent in response to a corresponding message of the first set of email messages for the respective reply message;
the set of responsiveness metrics includes at least one responsiveness metric based on a set of email access time periods;
each response time period of the set of email access time periods describes the time at which a corresponding message of the first set of email messages for a respective reply message was first opened following delivery indicated by a respective read receipt message of the second set of email messages.

9. The method of claim 1, wherein detecting the first set of email messages comprises parsing each message of messages stored in an email client associated with the first correspondent to identify messages sent from the first correspondent to the second correspondent.

10. The method of claim 1, wherein the method is implemented within an email client, and wherein a representation describing the set of responsiveness metrics is displayed using a set of user interface controls provided through a user interface implemented by the email client.

11. A computer program product comprising a non-transitory computer readable storage medium having a computer executable program instructions stored thereon, wherein the computer executable program instructions, when executed by a computer processor, directs the computer processor to perform a method of increasing email correspondence responsiveness, the method comprising:
detecting a first set of email messages transmitted by a first correspondent to a second correspondent;
creating a tracking record based on the responsiveness of the second correspondent to each email message of the first set of email messages;
performing a first statistical analysis of the tracking record;
generating a set of responsiveness metrics based on the first statistical analysis;
detecting new outgoing email messages addressed to the second correspondent; and
providing a user-configurable email message format for each detected outgoing message, the user-configurable email message format being configured to increase effective email response time from the second correspondent, and the user-configurable email message format being based on the set of responsiveness metrics;
wherein the user-configurable email message format includes a set of selectable alert options to the first correspondent using a set of user interface controls, and
wherein the set of selectable alert options includes a first option and a second option, the first option being for a first alert to be provided if the expected time at which the second correspondent will send a reply message to the new outgoing email message has passed, and the second option for a second alert to be provided upon the first correspondent composing a follow-up email message to the new outgoing email message to the second correspondent in the message composition window if the expected time at which the second correspondent will send a reply message to the new outgoing email message has not passed.

12. The computer program product of claim 11, further comprising:
displaying a formatted representation of the set of responsiveness metrics to the first correspondent within an email client associated with the first correspondent, the email client storing the first set of email messages in a message store.

13. The method of claim 11, further comprising:
detecting a second set of email messages transmitted by the second correspondent to the first correspondent;
updating the tracking record based on the responsiveness of the second correspondent associated with each email message of the second set of email messages;
performing a second statistical analysis of the second set of email messages transmitted to the second correspondent; and
generating the set of responsiveness metrics based on the first statistical analysis and the second statistical analysis.

14. The method of claim 13, wherein:
the second set of email messages includes a set of reply messages and a set of read receipt messages, each reply message of the set of reply messages having been sent by the second correspondent to the first correspondent in response to a corresponding message of the first set of email messages.

15. The method of claim 14, wherein:
the set of reply messages indicates times at which a reply message was sent; and
the set of read receipt messages indicates elapsed times between a time at which a corresponding message of the first set of email messages was accessed by the second correspondent and a time at which said corresponding message was transmitted.

16. The method of claim 13, wherein detecting the second set of email messages comprises parsing each message of messages stored in an email client associated with the first correspondent to identify messages sent from the second correspondent to the first correspondent.

17. The method of claim 11, wherein the set of responsiveness metrics includes an average time metric, a median time metric, a maximal time metric, and a minimal time metric for response time periods associated with the first set of email messages.

18. An email correspondence system comprising:
a first computer apparatus configured to provide email access to a first user through an email client executed on the first computer apparatus; and
a second computer apparatus in communication with the first computer apparatus, the second computer apparatus configured to provide email access to a second user through an email client executed on the second computer apparatus;
wherein computer readable instructions are stored in a memory of the second computer apparatus and the computer readable instructions, when executed by a processor of the second computer apparatus, cause the processor to execute a method of increasing email correspondence responsiveness, the method comprising:
detecting a first set of email messages transmitted by the second user to the first user;
creating a tracking record stored in the memory based on the responsiveness of the first user to each email message of the first set of email messages;
performing a first statistical analysis of the tracking record;
generating a set of responsiveness metrics based on the first statistical analysis;
detecting new outgoing email messages addressed to the first user; and
providing a user-configurable email message format for each detected outgoing message, the user-configurable email message format being configured to increase effective email response time from the first user, and the user-configurable email message format being based on the set of responsiveness metrics;
wherein the user-configurable email message format includes a set of selectable alert options to the first correspondent using a set of user interface controls, and
wherein the set of selectable alert options includes a first option and a second option, the first option being for a first alert to be provided if the expected time at which the second correspondent will send a reply message to the new outgoing email message has passed, and the second option for a second alert to be provided upon the first correspondent composing a follow-up email message to the new outgoing email message to the second correspondent in the message composition window if the expected time at which the second correspondent will send a reply message to the new outgoing email message has not passed.

* * * * *